United States Patent
Wang

(10) Patent No.: US 9,317,366 B2
(45) Date of Patent: *Apr. 19, 2016

(54) PROTOCOL CHECKING LOGIC CIRCUIT FOR MEMORY SYSTEM RELIABILITY

(71) Applicant: INPHI CORPORATION, Santa Clara, CA (US)

(72) Inventor: David Wang, Westlake Village, CA (US)

(73) Assignee: INPHI CORPORATION, Santa Clara, CA (US)

(*) Notice: Subject to any disclaimer, the term of this patent is extended or adjusted under 35 U.S.C. 154(b) by 121 days.

This patent is subject to a terminal disclaimer.

(21) Appl. No.: 14/593,257

(22) Filed: Jan. 9, 2015

(65) Prior Publication Data

US 2015/0121133 A1 Apr. 30, 2015

Related U.S. Application Data

(63) Continuation of application No. 13/797,623, filed on Mar. 12, 2013, now Pat. No. 8,966,327.

(60) Provisional application No. 61/662,649, filed on Jun. 21, 2012.

(51) Int. Cl.
G06F 11/07 (2006.01)
G06F 11/10 (2006.01)
G06F 12/00 (2006.01)
G06F 11/00 (2006.01)

(52) U.S. Cl.
CPC .......... *G06F 11/1076* (2013.01); *G06F 11/008* (2013.01); *G06F 11/1004* (2013.01); *G06F 11/1016* (2013.01); *G06F 12/00* (2013.01)

(58) Field of Classification Search
CPC .............................. G06F 11/10; G06F 11/1004
USPC ......................................... 714/42, 49
See application file for complete search history.

(56) References Cited

U.S. PATENT DOCUMENTS

| | | | | |
|---|---|---|---|---|
| 5,548,742 | A * | 8/1996 | Wang et al. | 711/128 |
| 6,480,975 | B1 * | 11/2002 | Arimilli et al. | 714/52 |
| 2005/0138267 | A1 * | 6/2005 | Bains et al. | 711/100 |
| 2006/0190780 | A1 * | 8/2006 | Gower et al. | 714/718 |
| 2006/0220227 | A1 * | 10/2006 | Marro | 257/723 |
| 2007/0088974 | A1 * | 4/2007 | Chandwani et al. | 714/6 |

(Continued)

*Primary Examiner* — Chae Ko
(74) *Attorney, Agent, or Firm* — Richard T. Ogawa; Ogawa P.C.

(57) ABSTRACT

A buffer integrated circuit device. The device comprising an output driver formed on the substrate member, the output driver having at least a command bus and an address bus. The device has a protocol and parity checking block ("Block"). The device has a table configured in the block. The table is programmable with a plurality of timing parameters. The device has a memory state block coupled to the table and a command history table coupled to the table to process protocol information for all commands that pass through the Block. The buffer integrated circuit device utilizes the protocol checking functionality to prevent failure propagation and enables data protection even in the case of host memory controller failure or system-level failure of any signal or signals on the command, control and address bus from the host memory controller to the buffer integrated device.

20 Claims, 8 Drawing Sheets

(56) References Cited

U.S. PATENT DOCUMENTS

| | | | |
|---|---|---|---|
| 2007/0250756 A1* | 10/2007 | Gower et al. | 714/763 |
| 2009/0125592 A1* | 5/2009 | Hartwich et al. | 709/206 |
| 2010/0077140 A1* | 3/2010 | Abraham et al. | 711/106 |
| 2012/0290897 A1* | 11/2012 | Yoon et al. | 714/766 |
| 2013/0024735 A1* | 1/2013 | Chung et al. | 714/704 |
| 2013/0054949 A1* | 2/2013 | Berke et al. | 713/2 |
| 2014/0122856 A1* | 5/2014 | Berke et al. | 713/1 |
| 2014/0191180 A1* | 7/2014 | Sun et al. | 257/2 |

* cited by examiner

FIGURE 3B

Table 2 — State Diagram Command Definitions

| Abbreviation | Function | Abbreviation | Function | Abbreviation | Function |
|---|---|---|---|---|---|
| ACT | Active | Read | RD, RDS4, RDS8 | PDE | Enter Power-down |
| PRE | Precharge | Read A | RDA, RDAS4, RDAS8 | PDX | Exit Power-down |
| PREA | Precharge All | Write | WR, WRS4, WRS8 | SRE | Self-Refresh entry |
| MRS | Mode Register Set | Write A | WRA, WRAS4, WRAS8 | SRX | Self-Refresh exit |
| REF | Refresh | RESET | Start RESET Procedure | MPR | Multi-Purpose Register |
| ZQCL | ZQ Calibration Long | ZQCS | ZQ Calibration Short | | |

NOTE: See "Command Truth Table" on page 33 for more details.

PROTOCOL CHECKING LOGIC CIRCUIT FOR MEMORY SYSTEM RELIABILITY

CROSS-REFERENCE TO RELATED APPLICATIONS

The present invention claims priority to and is a continuation of U.S. patent application Ser. No. 13/797,623, filed on Mar. 12, 2013, which is a non-provisional of U.S. Provisional Application No. 61/662,649 filed Jun. 21, 2012, now U.S. Pat. No. 8,966,327, which are incorporated by reference herein for all purposes. The present application is also related to U.S. Ser. No. 12/267,355, now U.S. Pat. No. 8,898,368, and U.S. Ser. No. 12/563,308, now U.S. Pat. No. 8,275,936, commonly owned, and hereby incorporated by reference herein.

BACKGROUND OF THE INVENTION

This invention relates generally to memory systems, and more particularly to memory systems which include a memory buffer that serves as an interface between a host controller and memory devices or other memory buffering devices residing on a DIMM, the memory buffer being optionally located on the DIMM itself or as part of the motherboard on which the DIMM connectors are also located.

Traditional computer systems, such as servers, workstations, desktops and laptops, all use pluggable memory which can be inserted into slots on the computer's motherboard as needed. The most common form of pluggable memory is the Dual In-line Memory Module (DIMM). Historically, DIMMs contain multiple RAM chips—typically DRAM—each of which has a data bus width of 4 or 8 bits. Typically, eight or nine 8-bit DRAM chips (or twice as many 4-bit DRAM chips) are arranged in parallel to provide each DIMM with a total data bus width of 64 or 72 bits; the data bus, typically referred to as the 'DQ' bus, is connected to a host controller. Each arrangement of 64 or 72 data bits using DRAM chips in parallel is termed a 'rank'.

A command/address (CA) bus also runs between the host controller and each DIMM; the CA and DQ busses together form a 'system' bus. With a basic unbuffered DIMM, the CA bus is connected to every DRAM on the DIMM. As a result, there is a high electrical load on the CA bus, given by the product of the number of DRAMs times the number of ranks. For the DQ bus, the number of electrical loads is equal to the number of ranks.

A buffering device is employed to reduce loading in a 'load reduction' DIMM (LR-DIMM). An LR-DIMM containing multiple DRAM chips uses a logic device to buffer the DQ and CA signals between the DRAMs and a host controller. The logic device may be, for example, a single device such as the iMB (isolating Memory Buffer) from Inphi Corporation. Memory systems of this sort are described, for example, in co-pending U.S. patent application Ser. Nos. 12/267,355 and 12/563,308, which are incorporated herein by reference, for all purposes.

SUMMARY

This invention relates generally to memory systems, and more particularly to memory systems which include a memory buffer that serves as an interface between a host controller and the RAM chips (typically DRAM) residing on a DIMM, the memory buffer being optionally located on the DIMM itself or as part of the motherboard on which the DIMM connectors are also located.

In an example, the present invention provides a buffer integrated circuit device. The device comprising an output driver formed on the substrate member, the output driver having at least a command bus and an address bus. The device has a protocol and parity checking block ("Block"). The device has a table configured in the block. The table is programmable with a plurality of timing parameters. The device has a memory state block coupled to the table and a command history table coupled to the table to process protocol information for all commands that pass through the Block.

In an example, the present invention provides a buffer integrated circuit device. The device has a substrate member (e.g., chip) comprising a silicon bearing material. The device has an output driver formed on the substrate member. The output driver has at least a command bus and an address bus. The command bus and the address bus are configured to a plurality of memory devices. The device has a protocol and parity checking block ("Block"), the protocol and parity checking block comprising a protocol circuit formed on the silicon bearing material and a parity circuit configured with the protocol circuit. The device has a table configured in the block. The table is programmable with a plurality of timing parameters, which include at least one or two of tCL, tRCD, tRP, tWR, tAL, tRFC, tRRD, tCCD, tRAS, or tCWL. The device has a memory state block, which is coupled to the table. The device has a command history table. The command history table is coupled to the table, and is configured with the memory state block to process protocol information for all commands that pass through the Block.

In an example, the Block blocks propagation of an erroneous command capable of causing any of the memory devices to transition to an unknown or undefined state; and is configured to transmit a predefined command sequence to set the memory devices to a safe or known state during a catastrophic failure of a host memory controller or any signaling failures of the command bus, the control bus, and address bus coupled to the host memory controller. In an example, the Block maintains that only a command that respect a timing and a sequence of a defined memory access protocol is allowed to propagate through to the memory devices. In an example, the device further comprises a channel for parity information.

In an example, the Block is configured to process information in both the command bus and the address bus to identify an erroneous command or erroneous address bus information and configured to block the erroneous command or erroneous address bus information and preserve a known state of the plurality of memory devices; and configured to initiate a process to maintain the plurality of memory devices in the known state. In an example, the device has an address input receiver; and an address driver. In example, the device has a multiplexer coupled to the host memory controller.

In an example, the present invention provides a method for operating a DIMM apparatus. The DIMM apparatus comprises a plurality of memory devices. Each of the plurality of memory devices is coupled to a separate buffer device coupled to a host computer. The separate buffer device comprises a substrate member comprising a silicon bearing material, and an output driver formed on the substrate member. The output driver has at least a command bus and an address bus. The command bus and the address bus are configured to the plurality of memory devices. The apparatus has a protocol and parity checking block ("Block"), which comprises a protocol circuit formed on the silicon bearing material and a parity circuit configured with the protocol circuit. A table is configured in the Block. The table is programmable with a plurality of timing parameters being at least one or two of tCL, tRCD, tRP, tWR, tAL, tRFC, tRRD, tCCD, tRAS, tWTR, tRTP, tCKE, tFAW, or Tcwl. The apparatus has a memory state block coupled to the table and a command history table coupled to the table.

The method includes transferring information to and from the buffer device from the host computer or the plurality of memory devices and processing the information from either or both a command bus or/and an address bus to identify an erroneous command or erroneous address bus information. The method includes blocking the erroneous command or erroneous address bus information. The method also includes transferring instructions to preserve or return the plurality of memory devices to a known state. The method also processing protocol information for selected or all commands that pass through the Block.

These and other features, aspects, and advantages of the present invention will become better understood with reference to the following description and claims.

BRIEF DESCRIPTION OF THE DRAWINGS

FIGS. 3A and 3B show a state diagram of a DDR3 SDRAM device. The state diagram is an illustrative example of the behavior of a given memory device as it responds to specific commands in transitioning from state to state.

DETAILED DESCRIPTION OF THE SPECIFIC EMBODIMENTS

The present invention relates to memory storage systems and devices.

Figure 1:
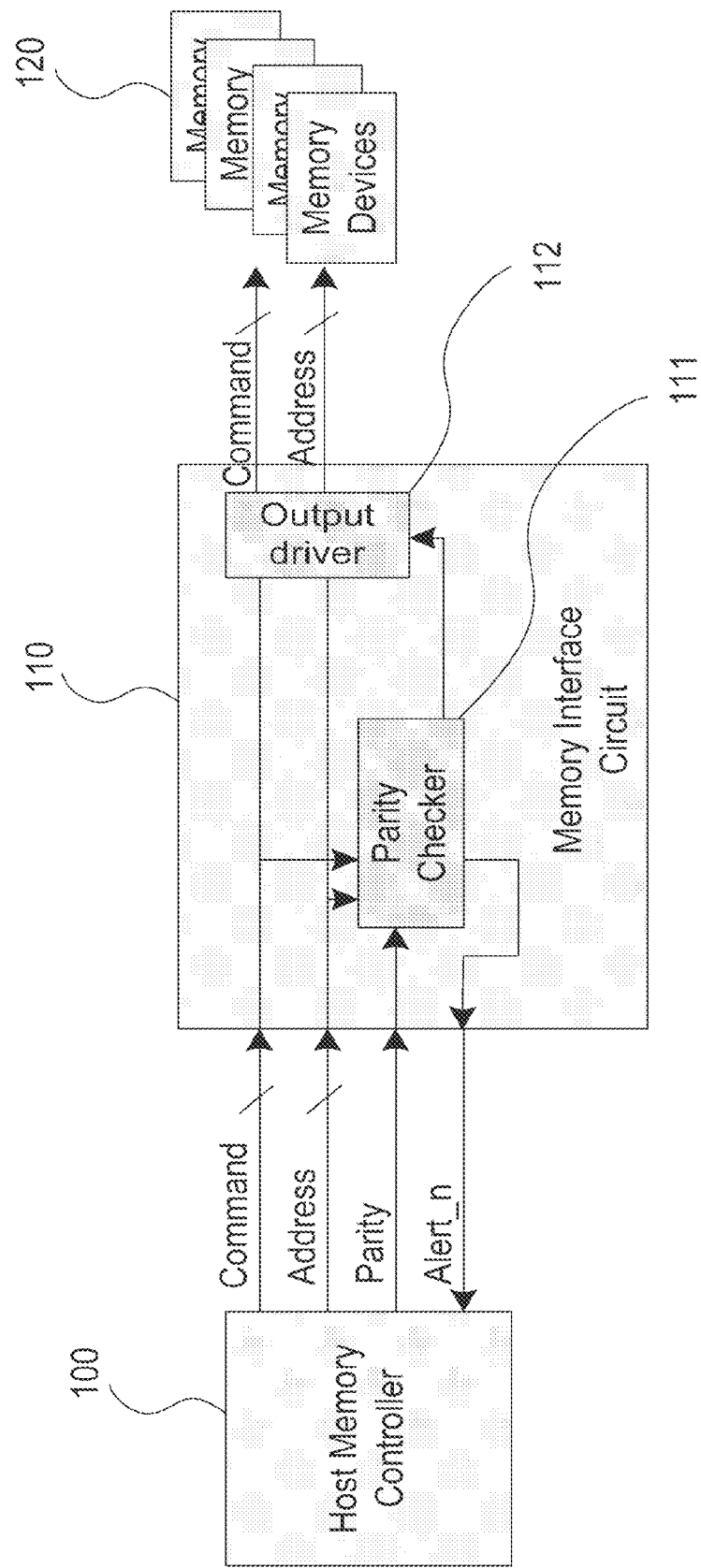
FIG. 1 illustrates a baseline memory system that comprises of a host memory controller according to an embodiment of the present invention.

FIG. 1 illustrates a baseline memory system that consists of a host memory controller, 100, a memory interface circuit 110, and multiple memory devices 120. One example of the memory interface circuit 110 illustrated is a DDR3 Registering Clock Driver (RCD). A second example of the memory interface circuit 110 illustrated is a DDR4 Registering Clock Driver (RCD). The description of the memory interface circuit 110 is generic in nature, and many other circuits may be broadly categorized as a memory interface circuit. Moreover, the use of the DDR3 Registering Clock Driver should be considered as illustrative, and the invention may be broadly applicable to other types of memory devices. In the baseline memory system, the host controller 100 issues commands to the memory interface circuit 110, and the memory interface circuit checks the parity and in turn re-drives the command and address signals to the memory devices 120. In the case that the parity is incorrect, the output driver block 112 may block the erroneous command to the DRAM devices.

The issue with the baseline memory system is that the command and address bus is protected only with simple parity scheme. In general, simple parity schemes, such as the one illustrated in FIG. 1, protect against the case of the incorrect delivery of a single signal. However, in the case of a catastrophic failure of the host memory controller 100, the command, address and parity inputs may fluctuate randomly, resembling randomized command and address transmissions. In such cases, at the instance of host memory controller failure, unintended commands may be re-driven to the memory devices, illustrated as 120.

One consequence of the simple parity-protected command and address channel is that such a channel is susceptible to the propagation of erroneous commands through the memory interface circuit to the memory devices. Even in the case that the memory interface circuit either detects for, or is informed of the host failure and the possible occurrence of erroneous commands, such commands would have already propagated into the memory devices, making state recovery difficult if not impossible.

Figure 2:
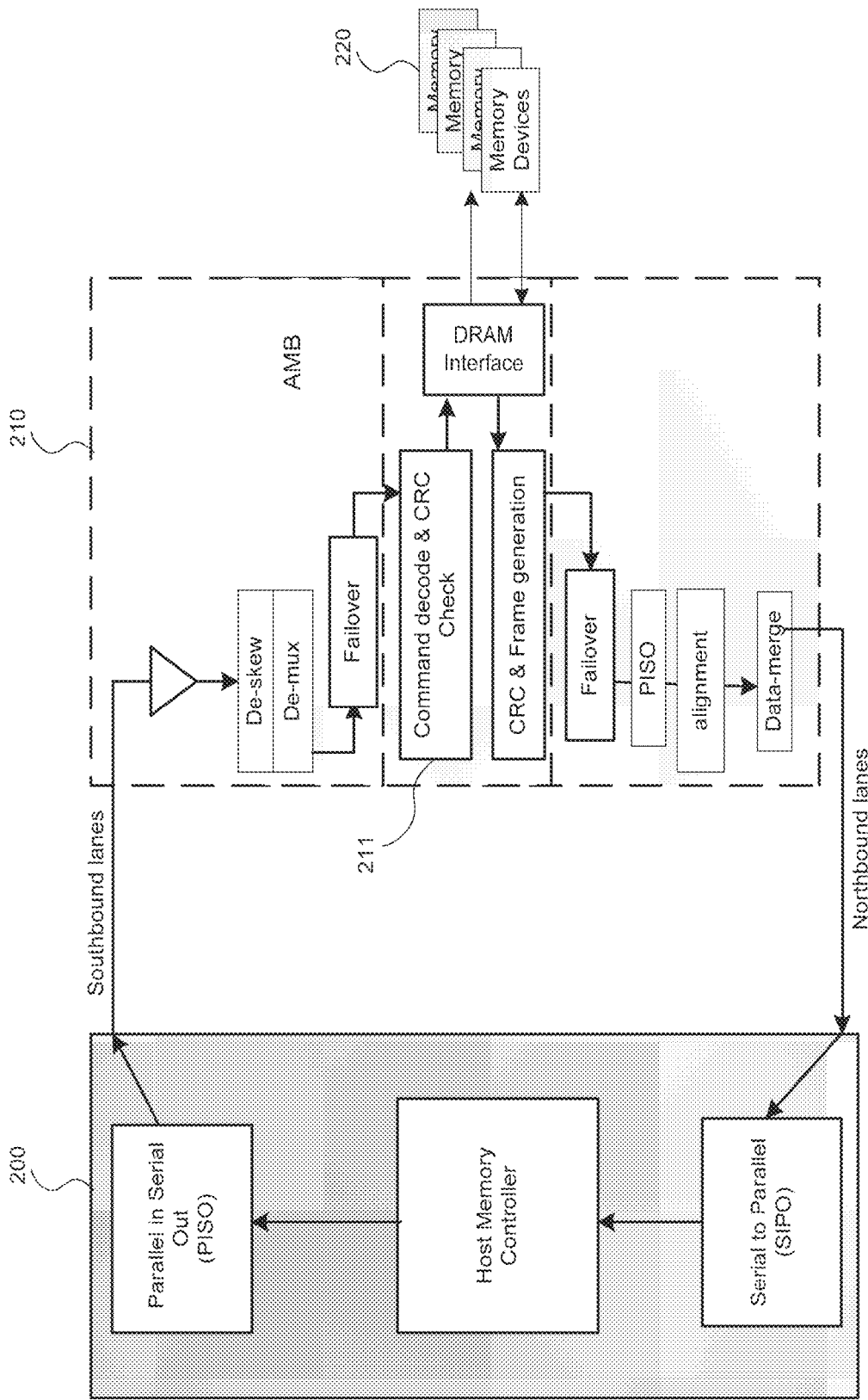
FIG. 2 illustrates a Fully Buffered DIMM Memory system that utilizes the Advanced Memory Buffer (AMB), connected to DDR2 SDRAM devices according to an embodiment of the present invention.

FIG. 2 illustrates a Fully Buffered DIMM Memory system that utilizes the Advanced Memory Buffer (AMB) 210, connected to DDR2 SDRAM devices, 220. In terms of the difference in the protection of command and address transmission, the Figure shows that the command and address transmission from the host memory controller 200, to the AMB 210, is protected by a Cyclic Redundancy Checking circuit. Consequently, in the case of a host memory controller failure or any other failure that places a random, erroneous command into the memory system, the parity checking circuit 111 may allow the command to propagate through to the DRAM devices with a 50% probability, while CRC checking circuitry 211 will in all probability reject the erroneous command due to incorrect CRC.

Figure 3A:
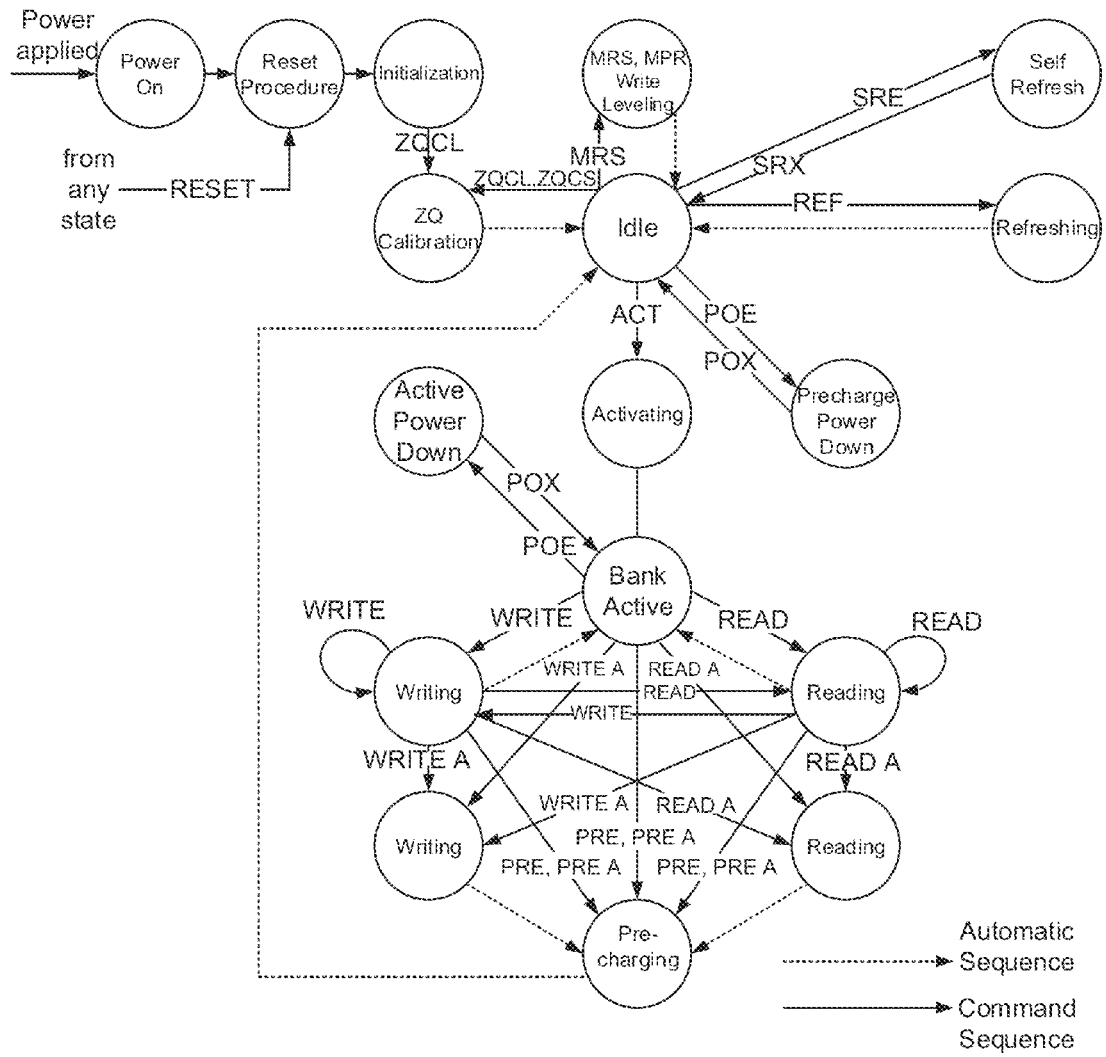

FIGS. 3A and 3B show the state diagram of a DDR3 SDRAM device. The state diagram is an illustrative example of the behavior of a given memory device as it responds to specific commands in transitioning from state to state. During normal operation of a given memory system, the host memory controller contains timing control registers and state machines that ensure the correctness of operation of the memory device such as the DDR4 SDRAM device. That is, the memory controller will allow only commands that respect the memory access protocol in terms of sequence and timing.

The description below provides a DRAM command sequence that is designed to bring the DRAM memory devices attached to an Advanced Memory Buffer (AMB) to a safe, known state of self-refresh to protect the integrity of the stored data while the AMB initiates a link recovery procedure. The Advanced Memory Buffer is required to manage DRAM refresh during channel resets and when refresh is enabled through DAREFTC CSR. When a channel reset event is detected, the Advanced Memory Buffer will take the DRAM's from an unknown state and put them into self-refresh mode. The Advanced Memory Buffer does not track the DRAM state during normal operation, and so has a single process for getting from any DRAM state starting point to the self-refresh state.

When a reset event is detected, the Advanced Memory Buffer's self-refresh FSM will execute the following steps:

1. Clear the DAREFTC. AREFEN CSR to stop the Advanced Memory Buffer auto-refresh
engine if enabled.
2. Block all DRAM commands, except those initiated by the self-refresh FSM.
3. Wait until any in-process read or write commands complete, with a minimum wait time of
DSREFTC.TCKE, the DRAM "Minimum CKE pulse width time" specification. In-process reads/writes must complete to ensure that the DRAM ODT control outputs are driven low.

The minimum time allows for the case where self-refresh entry the CKE or power-down entry was executed just before the channel reset.

4. Assert both CKE output pins by setting the DRC.CKE0/1 CSR fields. This will have no effect on the DRAM's if the CKE pins were already asserted.

5. Wait DSREFTC. TXSNR, the DRAM's "Exit self-refresh to a non-read command"

specification, to allow any in process DRAM command to complete. This allows time to complete any command that may have been issued just before the channel reset event, such as an auto-refresh, as well as allows for self-refresh exit that may have been initiated when the self-refresh FSM asserted the CEK pins high.

6. Issue a "precharge all" command to both ranks. This guarantees that the DRAM's will be in an "idle" state.

7. Wait as required by DSREFCT. TRP, the DRAM "Precharge Time."

8. Issue an auto-refresh command to both ranks. This meets the DRAM requirement that at least one auto-refresh command is issued between any self-refresh exit to self-refresh entry transition.

9. Wait as required by DAREFTC.TRFC, the DRAM "Refresh to active/refresh command time."

10. Issue a self-refresh entry command to both ranks.

When the channel comes out of "fast reset" (exiting the FBD link disable state), the Advanced Memory Buffer will automatically issue a self-refresh exit command to both ranks after the FBD Link Testing State is reached and the Advanced Memory Buffer core clock is stable. Note that this does not apply when the DISSREXIT bit is set as it should be when the Advanced Memory Buffer is powering up, when exiting S3 mode, when exiting a channel reset that is a part of powering up or exiting S3 mode. Unfortunately, the DRAM command sequence cannot be used to move the DRAM devices from a normal operating state to the safe, known state of self-refresh in the case of a host memory controller failure in a baseline memory system illustrated in FIG. 1. That is, in the case of the baseline memory system in FIG. 1 the parity checking circuit 111 in FIG. 1 may allow the command to propagate through to the DRAM devices with a 50% probability, and a given DRAM device such as the DDR3 SDRAM device illustrated in FIGS. 3A and 3B may receive one or more erroneous commands that do not respect the memory access protocol in terms of sequence or timing. Consequently, the DRAM device may transition to an unknown or undefined state, and the result is that no command sequence can be predefined and guaranteed to move the DRAM devices to a safe, known state in the case that erroneous commands have already been issued to the DRAM device.

Figure 4:
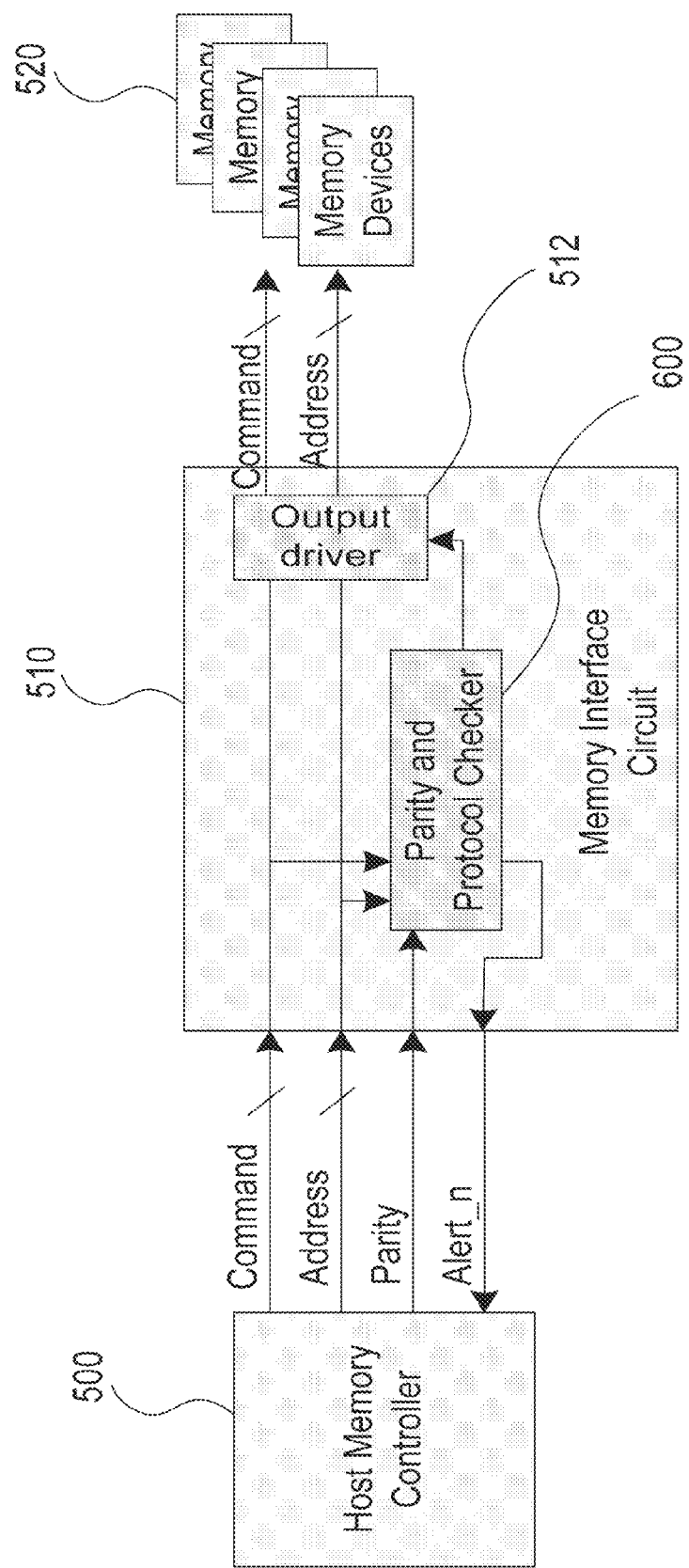
FIG. 4 illustrates a memory system that is structurally similar to the baseline memory system illustrated in FIG. 1.

FIG. 4 illustrates a memory system that is structurally similar to the baseline memory system illustrated in FIG. 1. The difference between FIG. 1 and FIG. 4 is that the Memory interface circuit 510 in FIG. 4 includes an improved protection circuit that not only checks for the correctness of parity, but also checks for the correctness of DRAM protocol before enabling the output drive functionality of the output driver 512 in FIG. 4.

Figure 5:
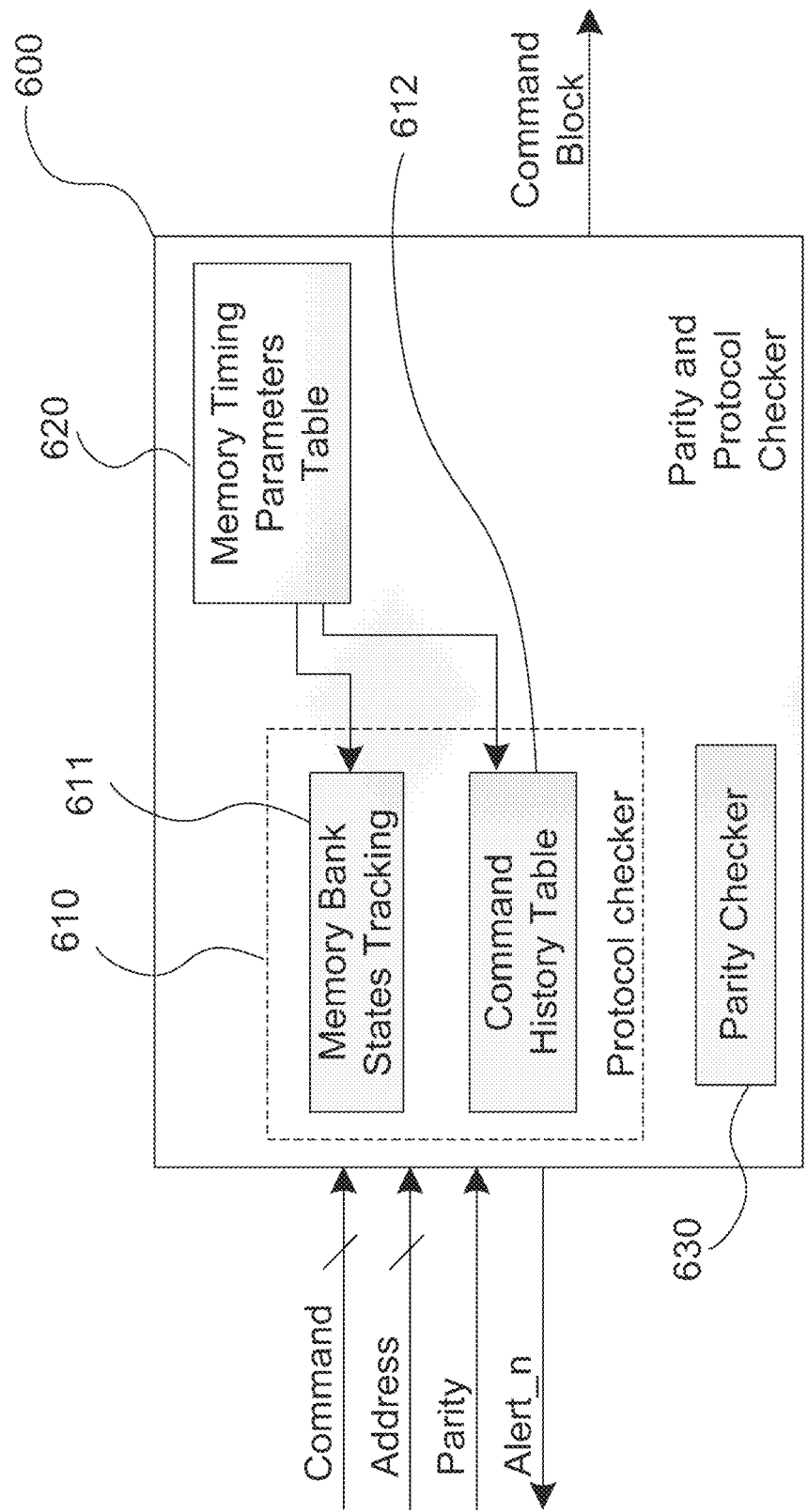
FIG. 5 illustrates an example implementation of the Protocol and Parity Checking Block.

FIG. 5 illustrates an example implementation of the Protocol and Parity Checking Block 600. FIG. 5 illustrates that the Protocol and Parity Checking Block 600 contain a Memory Timing Parameters Table 620 where memory timing parameters such as tCL, tRCD, tRP, tWR, tAL, tRFC, tRRD, tCCD, tRAS, tCWL for a DDR3 SDRAM device are programmed into the memory timing parameters table, in the case that the parity checking block is designed to check for the protocol correctness of a DDR3 SDRAM memory system. The Figure further illustrates that the Protocol and Parity Checking Block 600 also contain a protocol checker subblock 610 that may itself contain a sub-block 611 that uses registers and state machines to keep track of memory bank states, or a memory command history table 612, or the combination of both 611 and 612 to effectively check for the protocol correctness of all commands that pass through the Protocol and Parity Checking Block 600. In this manner, the Protocol and Parity Checking Block 600 guarantees that only commands that respect the timing and sequence of defined memory access protocol will be allowed to propagate through to the memory devices.

The claimed innovation here is that the memory interface circuit with Protocol and Parity Checking Block 600 can effectively prevent the propagation of erroneous commands that may transition the memory devices to an unknown or undefined state. Therefore, a predefined command sequence such as the one illustrated can be utilized to move the memory devices to a safe, known state even in the case of catastrophic failure of the host memory controller or the command and address channel between the host memory controller and the memory interface circuit.

Figure 6:
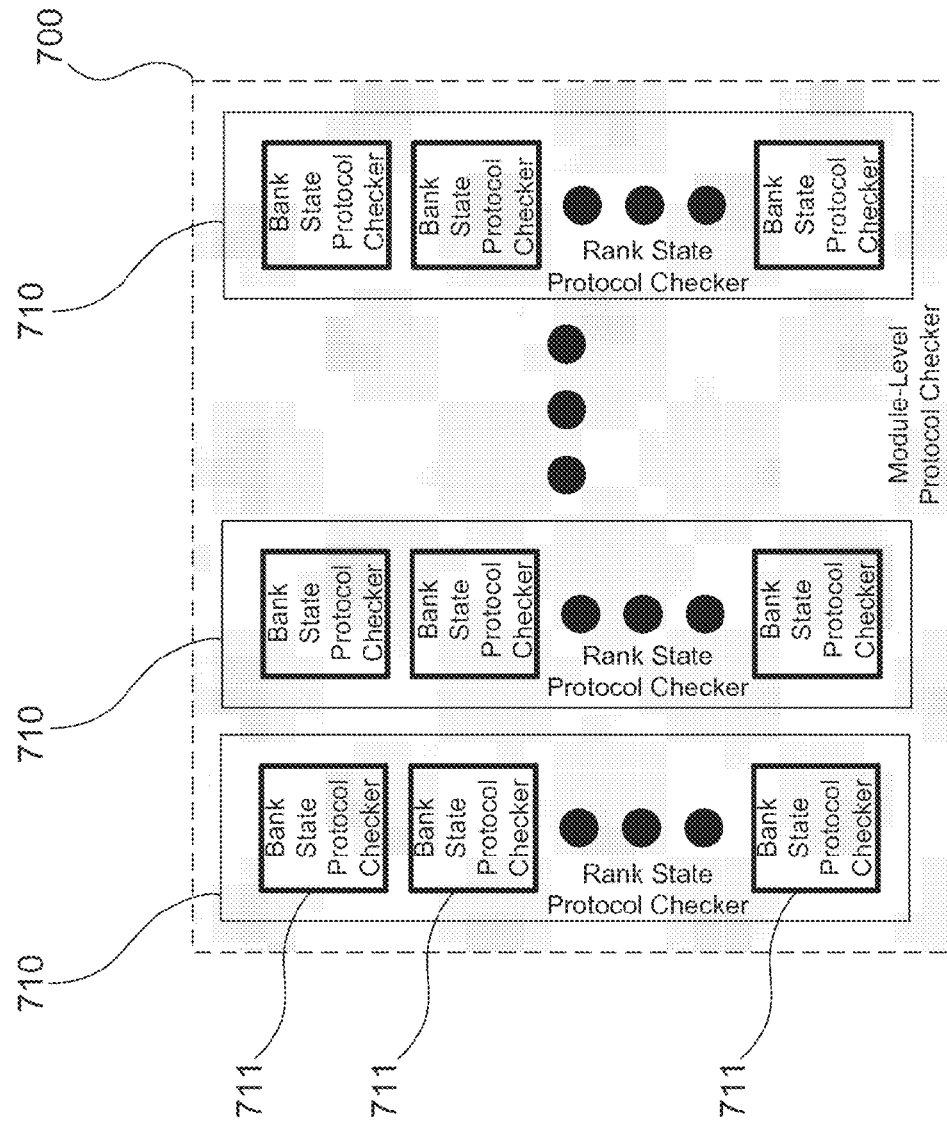
FIG. 6 is a simplified diagram of a protocol checker module according to an embodiment of the present invention.

FIG. 6 is a simplified diagram of a protocol checker module according to an embodiment of the present invention. The module includes a plurality of rank blocks. Each of the blocks includes a plurality of bank state protocol checkers. The protocol checker module in FIG. 6 is intended to illustrate the hierarchy of a protocol checker block that stores the state of the module, ranks on the module, and banks within each rank.

Figure 7:
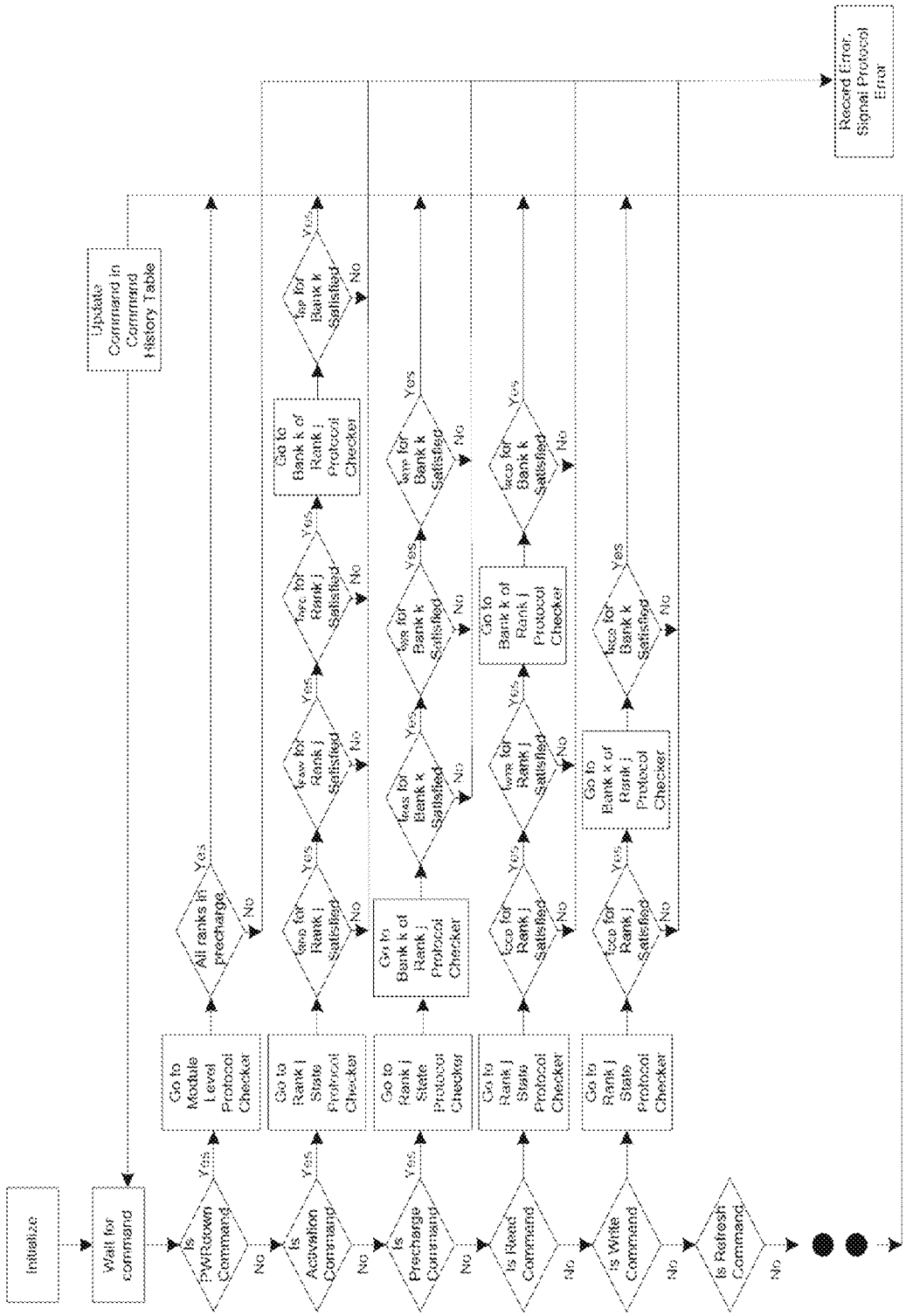
FIG. 7 is a simplified flow diagram illustrating a process for checking protocol based upon rank and bank according to an embodiment of the present invention.

FIG. 7 is a simplified flow diagram illustrating a process for checking protocol based upon rank and bank according to an embodiment of the present invention. The simplified flow diagram illustrates the function of the protocol checker block, as each command from the host memory controller or change in the state of the control or clock signals from the host memory controller is checked against the history of previous commands, the current state of the memory device, and the elapsed timing from previous command histories to determine compliance to the DRAM memory access protocol. For example, FIG. 7 illustrates that in the case that a row activation command is sent to the protocol checking block, the protocol checking block must first to ensure that the row activation command to a specific rank j and bank k must meet timing guarantees of tRRD, tFAW, tRFC and tRP to previous activation, refresh and pre-charge commands. In the case that the various timing parameters, assumed to be programmed in to the protocol checking block by the host memory controller or self configured by the memory buffering device during the initialization phase, are not met by any command or changes in the control state, the protocol checking block signals a protocol error.

In an example, the present protocol checker is provided to identify faults and/or failures. In case of controller fault, random signals may be interpreted as commands in an example. In an alternative example, any random pattern has 50% chance of having correct parity and accepted as valid command. In an example, enhance existing parity-checking logic with memory timing table and command history table is integrated in a buffer device configured between the host controller and a DIMM to achieve improved fault tolerance.

In an example, the protocol checking logic can identify faults and rejects commands that do not conform to DRAM protocol. Examples of such faults include a normal DDRx Protocol violation, a refresh interval (tREFI) violation, a CKE violation, a MRS violation, a reset failure, and others. In an example, the present techniques indentify and protect against "all" single point failure.

Utilizes the protocol checking block state machine for failure detection and enables the rejection of bad command or command sequences to prevent failure propagation. In a preferred example, the present technique is configured on a buffer device to perform real-time analysis of DRAM command sequences that fly by, while allowing only command sequences that conform to the DRAM protocol to get passed onto the DRAM devices, which can guarantee that the RCD/buffer will only transition between known good states as shown on FIG. 3A. In an example, the DRAM devices are guaranteed to be in a known-good state such that the system can then initiate a preset "homing sequence" to bring the DRAM devices down to a safe power-down state.

The present memory system includes one or more memory buffers, each of which is arranged to buffer data and/or command instructions (e.g. bytes) being written to or read from random access memory (RAM chips) residing on a Dual In-line Memory Module (DIMM) by a host controller of a host computer system. In various embodiments, the RAM chips are referred to hereinafter as DRAM, though the invention is not limited to any specific memory chip type or technology.

In an example, the present techniques can include a differential clock detector. If either tCK_t or tCK_c fails, disable clock feedback and keep y-clock outputs going for 50~100 cycles. In an example, the techniques specify minimum frequency and phase drift within 50~100 cycles, issue homing sequence: pre-charge all and self refresh entry, protocol checker can discern when clock is allowed to ramp down versus when it must be stable, and switch to backup clock after power down, among others.

In various embodiments, the memory buffer includes one or more additional hardware interfaces which are arranged to provide access to data stored in the DRAM chips, bypassing the host controller. In one example, the memory buffer might include a serial ATA (SATA) interface or the like such that in addition to serving as a buffer between a host controller and the DRAM, the memory buffer also serves as a buffer between the host controller and/or DRAM and external devices capable of interfacing with a SATA interface. Various example embodiments as described with reference to the accompanying drawings, in which embodiments have been shown. This inventive concept may, however, be embodied in many different forms and should not be construed as limited to the embodiments set forth herein. Rather, these embodiments are provided so that this disclosure is thorough and complete, and has fully conveyed the scope of the inventive concept to those skilled in the art. Like reference numerals refer to like elements throughout this application.

It has been understood that, although the terms first, second, etc. may be used herein to describe various elements, these elements should not be limited by these terms. These terms are used to distinguish one element from another. For example, a first element could be termed a second element, and, similarly, a second element could be termed a first element, without departing from the scope of the inventive concept. As used herein, the term "and/or" includes any and all combinations of one or more of the associated listed items.

It has be understood that when an element is referred to as being "connected" or "coupled" to another element, it can be directly connected or coupled to the other element or intervening elements may be present. In contrast, when an element is referred to as being "directly connected" or "directly coupled" to another element, there may be no intervening elements present. Other words used to describe the relationship between elements should be interpreted in a like fashion (e.g., "between" versus "directly between," "adjacent" versus "directly adjacent," etc.).

The terminology used herein is for the purpose of describing particular embodiments and is not intended to be limiting of the inventive concept. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements, and/or components, but do not preclude the presence or addition of one or more other.

Unless otherwise defined, all terms (including technical and scientific terms) used herein have the same meaning as commonly understood by one of ordinary skill in the art to which this inventive concept belongs. It has been be further understood that terms, such as those defined in commonly used dictionaries, should be interpreted as having a meaning that is consistent with their meaning in the context of the relevant art and will not be interpreted in an idealized or overly formal sense unless expressly so defined herein.

The embodiments of the invention described herein are exemplary and numerous modifications, variations and rearrangements can be readily envisioned to achieve substantially equivalent results, all of which are intended to be embraced within the spirit and scope of the invention as defined in the appended claims.

The invention claimed is:

1. A computing system, the system comprising:
a buffer integrated circuit device comprising:
a substrate member comprising a silicon bearing material;
an output driver formed on the substrate member, the output driver having at least a command bus and an address bus, the command bus and the address bus being configured to a plurality of memory devices;
a protocol and parity checking block ("Block"), the protocol and parity checking block comprising a protocol circuit formed on the silicon bearing material and a parity circuit configured with the protocol circuit;
a table configured in the block, the table being programmable with a plurality of timing parameters, the plurality of timing parameters being at least one or two of tCL, tRCD, tRP, tWR, tAL, tRFC, tRRD, tCCD, tRAS, or tCWL;
a memory state block, the memory state block coupled to the table; and
a command history table, the command history table coupled to the table, and configured with the memory state block to process protocol information for all commands that pass through the Block; and
a host memory controller in communication with the buffer integrated circuit device.

2. The device of claim 1 wherein the Block blocks propagation of an erroneous command capable of causing any of the memory devices to an unknown or undefined state; and configured to transmit a predefined command sequence to set the memory devices to a safe or known state during a catastrophic failure of a host memory controller or any signal or signals on the command bus, the control bus, and address bus coupled to the host memory controller.

3. The device of claim 1 wherein the Block maintains that only a command that respect a timing and a sequence protocol of a defined memory access protocol is allowed to propagate through to the memory devices.

4. The device of claim 1 further comprising a channel for parity information.

5. The device of claim 1 Block is configured to process information in the command bus, the control bus and the address bus to identify an erroneous command or erroneous address bus information, or erroneous control timing, and configured to block the erroneous command, erroneous control or erroneous address bus information and preserve a known state of the plurality of memory devices; and configured to initiate a process to maintain the plurality of memory devices in the known state and preserve the integrity of data contained therein.

6. The device of claim 1 further comprising an address input receiver; and an address driver.

7. The device of claim 1 further comprising a multiplexer coupled to the host memory controller.

8. The device of claim 1 further comprising a PLL normally coupled to the host memory controller, but may be decoupled from the host memory controller upon the detection of failure by the protocol checking block.

9. The device of claim 1 further comprising a VerfCA reference voltage input circuit coupled to the host memory controller.

10. The device of claim 1 further comprising a System Management Bus (SMBus) port coupled to the host SMBus controller.

11. A computing system comprising:
a buffer integrated circuit device comprising:
   a substrate member comprising a silicon bearing material;
   an output driver formed on the substrate member, the output driver having at least a command bus and an address bus, the command bus and the address bus being configured to a plurality of memory devices;
   a protocol and parity checking block ("Block"), the protocol and parity checking block comprising a protocol circuit formed on the silicon bearing material and a parity circuit configured with the protocol circuit, the Block is configured to process information in both the command bus and the address bus to identify an erroneous command or erroneous address bus information and configured to block the erroneous command or erroneous address bus information and preserve a known state of the plurality of memory devices; and configured to initiate a process to maintain the plurality of memory devices in the known state; and
   a table configured in the block, the table being programmable with a plurality of timing parameters, the plurality of timing parameters being at least one or two of tCL, tRCD, tRP, tWR, tAL, tRFC, tRRD, tCCD, tRAS, tWTR, tRTP, tCKE, tFAW, or tCWL;
   a memory state block, the memory state block coupled to the table; and
   a command history table, the command history table coupled to the table, and configured with the memory state block to process protocol information for all commands that pass through the Block; and
a host memory controller coupled to the buffer integrated circuit device.

12. The device of claim 8 wherein the Block comprises a plurality of rank state protocol checkers, each of the rank state protocol checkers comprising a plurality of bank state protocol checkers.

13. The device of claim 8 wherein the Block is configured to process all single point failures and instruct the plurality of memory devices to a known or predefined state.

14. The device of claim 8 wherein the Block is characterized as a hierarchical configuration including state of a module, rank of a module, and bank within each rank.

15. The device of claim 8 wherein the Block is characterized as a hierarchical configuration including state of a module, rank of a module, and bank within each rank and is configured to protect against all single point failures associated with the DIMM or a host computer.

16. A method for operating a host computer system coupled to a DIMM apparatus, the DIMM apparatus comprising a plurality of memory devices, each of the plurality of memory devices being coupled to a separate buffer device coupled to a host computer, the separate buffer device comprising a substrate member comprising a silicon bearing material, an output driver formed on the substrate member, the output driver having at least a command bus and an address bus, the command bus and the address bus being configured to the plurality of memory devices, and a protocol and parity checking block ("Block"), the protocol and parity checking block comprising a protocol circuit formed on the silicon bearing material and a parity circuit configured with the protocol circuit, a table configured in the block, the table being programmable with a plurality of timing parameters, the plurality of timing parameters being at least one or two of tCL, tRCD, tRP, tWR, tAL, tRFC, tRRD, tCCD, tRAS, tWTR, tRTP, tCKE, tFAW, or tCWL; a memory state block, the memory state block coupled to the table; and a command history table, the command history table coupled to the table, the method comprising:
   transferring information to and from the buffer device from the host computer system or the plurality of memory devices;
   processing the information from either or both a command bus or/and an address bus to identify an erroneous command or erroneous address bus information;
   blocking the erroneous command or erroneous address bus information; and
   transferring instructions to preserve or return the plurality of memory devices to a known state; and
   processing protocol information for all commands that pass through the Block.

17. The method of claim 16 wherein the Block comprises a plurality of rank state protocol checkers, each of the rank state protocol checkers comprising a plurality of bank state protocol checkers.

18. The method of claim 16 wherein the Block is configured to process all single point failures and instruct the plurality of memory devices to a known or predefined state.

19. The method of claim 16 wherein the Block is characterized as a hierarchical configuration including state of a module, rank of a module, and bank within each rank.

20. The method of claim 16 wherein the Block is characterized as a hierarchical configuration including state of a module, rank of a module, and bank within each rank and is configured to protect against all single point failures associated with the DIMM or the host computer.

* * * * *